July 11, 1933.  M. PHILIPSEN  1,918,130
THERMOMETER
Filed Oct. 31, 1930
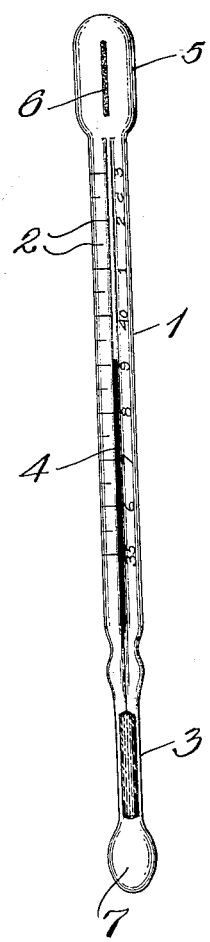
INVENTOR.
MICHAEL PHILIPSEN
BY Meyers Jones
ATTORNEYS.

Patented July 11, 1933

1,918,130

UNITED STATES PATENT OFFICE

MICHAEL PHILIPSEN, OF VEDBAK, DENMARK

THERMOMETER

Application filed October 31, 1930. Serial No. 492,554.

This invention is an improvement in thermometers, and more particularly in a clinical thermometer.

In the usual construction of thermometer, the body is triangular in cross section, and the scale is arranged at one face, which may be considered as the base, and a portion of the thermometer body adjacent to the base is formed to provide magnification, to enable easy reading of the scale.

It is somewhat difficult, however, to bring the column of mercury into the exact position where the magnification is operative, since the view of the magnified column of mercury is easily lost, if the thermometer is turned slightly too far, or if it falls just short of the magnifying position.

The object of this invention is to provide readily visible means in the nature of sighting elements for locating the magnifying portion of a clinical thermometer in exact position relative to the mercury column bore on the line of vision of an observer to facilitate the taking of a reading of the thermometer.

With this and other objects in view the invention consists in the construction and novel combination of parts fully described hereinafter, illustrated in the accompanying drawing, and pointed out in the claims appended hereto, it being understood that various changes in the form, proportion, size and minor details of construction within the scope of the claims, may be resorted to without departing from the spirit of the invention.

In the drawing forming a part hereof:—

Fig. 1 is a front elevation of one embodiment of the thermometer provided with the improvement.

Fig. 2 is an end view looking at the top of the thermometer.

Fig. 3 is a view similar to Fig. 1, with the parts in another position, and showing another type of thermometer body.

In the embodiment of the invention shown in Fig. 1, the body 1 of the thermometer is as usual, triangular in cross section, and the scale indicated at 2, is arranged on one face of the body. The scale is usually arranged on an opaque back, molded into the body of the thermometer, and the markings of the scale appear through the adjacent sides of the thermometer body, and through the magnifying portion.

At one end of the thermometer body is the usual bulb of mercury magazine 3, and the hair line bore for the column of mercury leads from the magazine toward the opposite end, along the center of the scale. The markings of the scale are calculated from the bulb and in the usual manner.

The improvement consists in providing an enlargement 5 on the body at the end remote from the bulb 3, the said enlargement being usually hollow, though it is obvious that it may be solid if desired, since it does not communicate with the mercury chamber. Upon this enlargement, which is cylindrical with rounded ends as shown, marks or indications are provided, at diametrically opposite points, and so arranged with respect to the elements of the thermometer body, that when the said marks are brought into exact register with the line of vision of an observer, the magnifying portion of the thermometer will be in line with the column of mercury, and in accurate position to magnify the same for the observer.

The indications 6 may be formed in the glass of the element 5 in any suitable or desired manner. In the construction of Fig. 1, the end of the body remote from the enlargement 5 has a rounded extension 7, which especially adapts the construction for a rectal thermometer, this arrangement forming the subject matter of my copending application Serial No. 331,335, filed on December 27, 1928.

In Fig. 3, the thermometer indicated generally at 8, is substantially the same as that shown in Fig. 1, having the extension 9 with the indications 10, and the bulb or mercury magazine 11, but the rounded extension 7 is omitted. The thermometer shown in Fig. 3 is adapted for general use.

It will be apparent from the showing and description, that the thermometer is of the usual type, of glass, or of a transparent material, including a body having the capillary tube for the mercury column, and the bulb or mercury magazine communicating with the tube, and that that portion of the body directly in front of the scale and the column of mercury in the tube is a magnifying lens to facilitate reading of the thermometer.

What is claimed as new is:—

1. A clinical thermometer having a mercury column and a magnifying portion in front of the column, sighting means for facilitating alining the mercury column and magnifying portion in the line of vision of an observer, said means comprising indicating marks on a part on the thermometer through which the marks are visible, and said marks being arranged at opposite sides of said part in a common plane through the mercury column and magnifying portion such that when said marks register in the line of vision of an observer the mercury column and magnifying portion also register in said line of vision for clear reading through said magnifying portion of the length of the mercury column.

2. In a clinical thermometer having a mercury column, a scale for indicating the height of the mercury column, and a magnifying portion to register with the mercury column along the scale in the line of vision of an observer to facilitate determining the height of the mercury column, indicating marks on the thermometer oppositely arranged and visible through the glass of the thermometer, and said marks being so positioned relative to the mercury column and magnifying portion that when they register in the line of vision of an observer the magnifying portion of the thermometer will also register with the scale and mercury column in said line of vision.

3. A clinical thermometer having a capillary tube for a mercury column, a scale for indicating the height of the mercury in the column, and a magnifying portion to register with the column and the scale in the line of vision of an observer, means to facilitate finding such registration, said means including an extension at the upper end of the thermometer of appreciable width and independent of the capillary tube, and indications on opposite sides of said extensions visible through said extension, and said indications being so positioned relative to the mercury column, magnifying portion, and each other, that when they are in registry in the line of vision of an observer the magnifying portion is also in registry in said line of vision of an observer for the purposes described.

Signed at Copenhagen, Denmark, this 9th day of July A. D. 1930.

MICHAEL PHILIPSEN.